Jan. 13, 1931.        R. C. KIVLEY        1,788,527
APPARATUS FOR TREATING ARTICLES WITH A MEDIUM UNDER PRESSURE
Filed Oct. 3, 1927
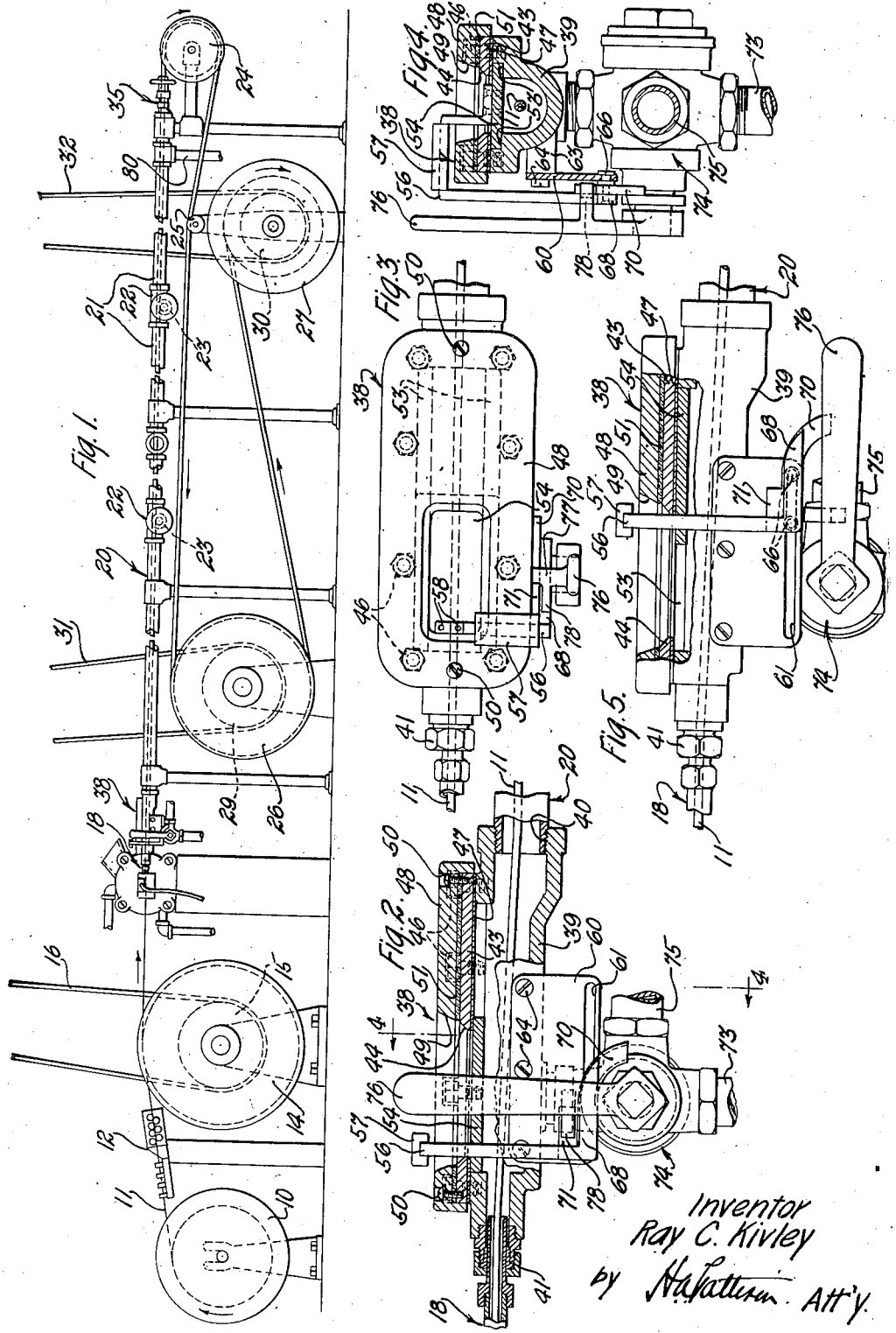
Inventor
Ray C. Kivley
by H. A. Patterson Att'y Patented Jan. 13, 1931

1,788,527

UNITED STATES PATENT OFFICE

RAY CHARLES KIVLEY, OF OAK PARK, ILLINOIS, ASSIGNOR TO WESTERN ELECTRIC COMPANY, INCORPORATED, OF NEW YORK, N. Y., A CORPORATION OF NEW YORK

APPARATUS FOR TREATING ARTICLES WITH A MEDIUM UNDER PRESSURE

Application filed October 3, 1927. Serial No. 223,589.

This invention relates to apparatus for treating articles with a medium under pressure, and more particularly to apparatus for producing vulcanized articles.

The principal object of the invention is to provide simple and improved apparatus whereby articles may be treated with a medium under pressure in a safe, expeditious and practical manner.

In accordance with the general features of the invention, one embodiment thereof includes an apparatus for continuously coating cores with vulcanizable insulating materials, comprising an extruding apparatus and a vulcanizing chamber associated therewith. A core to be coated is passed from a supply reel through the extruding apparatus which extrudes a coating of unvulcanized insulating material upon the core as it is advanced therethrough, from whence it passes through the vulcanizing chamber to effect vulcanization by heat and pressure. The vulcanizing chamber is connected to the extruding apparatus by a chambered connecting member which is provided with an outlet whereby access may be had to the core for the purpose of splicing when necessary and to facilitate the threading of the core through the apparatus. A freely movable cover is arranged to close the outlet and to seal the chamber against the exit of the vulcanizing medium by the pressure thereof. Means are also provided whereby the means regulating the passage of the vulcanizing medium into the vulcanizing chamber may be controlled by the position of the cover with respect to the outlet.

Other features and advantages of the invention will become apparent from the following detailed description, taken in conjunction with the accompanying drawing, wherein Fig. 1 is a semi-diagrammatic front elevation of an apparatus embodying the features of the invention:

Fig. 2 is an enlarged elevation, partly in section, of the improved connecting member;

Fig. 3 is a plan view thereof;

Fig. 4 is a vertical section taken on the line 4—4 of Fig. 2, and

Fig. 5 is a detail view similar to Fig. 2 with the cover shown in open position.

Referring now to the drawing and particularly to Fig. 1 thereof, the numeral 10 designates a supply reel from which a wire 11 which is to be coated is drawn through a suitable wire straightening device 12 by means of a capstan 14 driven through a pulley 15 by means of a belt 16 connected to a suitable source of power (not shown). The wire passes around the capstan 14 and then through an extruding apparatus designated generally by the reference numeral 18 which is adapted to extrude a uniform coating of unvulcanized insulating material upon the wire as it is advanced therethrough. The extruding apparatus 18 may be of any well known type and is illustrated only diagrammatically since a detailed description of its construction is not essential to a complete understanding of the present invention. A preferred type of extruding apparatus is disclosed in my copending application, Serial No. 112,599, filed May 29, 1926, issued as Patent 1,770,985, July 22, 1930, and reference is directed to this patent for a detailed description of such extruding apparatus.

Upon emerging from the extruding apparatus, the coated wire passes directly and without being exposed to the atmosphere into a vulcanizing chamber 20 wherein the coating is vulcanized by being subjected to a vulcanizing medium such as steam under pressure. As shown in Fig. 1, the vulcanizing chamber comprises a plurality of tubes 21—21 which are interconnected by means of chambered members 22—22 in each of which is mounted a rotatable sheave or pulley 23 which serves to guide the coated wire through the vulcanizing chamber. The coated wire is advanced through the vulcanizing chamber and is drawn over a guide sheave 24 and an idler 25 by means of a capstan 26 from which the coated wire is delivered to a take-up reel 27. The capstan 26 and the take-up reel 27 are driven through pulleys 29 and 30, respectively, by means of belts 31 and 32 connected to any suitable source of power (not shown).

The coated wire emerges from the end of the vulcanizing chamber through a seal 35 which prevents the escape of any appreciable amount of vulcanizing medium from the interior of the chamber. This seal may be of any well known type and is illustrated only diagrammatically since it does not constitute a part of the present invention. A preferred type of seal is disclosed in the copending application of L. F. Lamplough, Serial No. 112,600, filed May 29, 1926, issued as Patent 1,689,205, October 30, 1928, and reference is directed to this patent for a detailed description of the construction of the seal.

In accordance with the features of the present invention, a connecting member 38 (Figs. 2, 3, 4 and 5) is provided for effecting a pressure-tight connection between the extruding apparatus 18 and the vulcanizing chamber 20. This connecting member comprises a chambered body portion 39, one end of which is tapped as indicated at 40 (Fig. 2), whereby one end of the vulcanizing chamber 20 is tightly connected therewith, while the opposite end of the body portion 39 is connected to the extruding apparatus 18 through a stuffing box 41 (Fig. 2) which may be of any well known type. A plate 43 having an outlet opening 44 formed therein is secured upon the top side of the body portion 49 by means of bolts 46—46, a gasket 47 positioned between the plate 43 and the body portion 39 serving to effect a pressure-tight joint therebetween. An insulating cover plate 48 having an aperture 49 coinciding with the outlet opening 44 in the plate 43, is secured upon the plate 43 by means of screws 50—50, and an insulating gasket 51 is positioned between the cover plate 48 and the plate 43. The upper side of the body portion 39 is provided with grooves 53—53 in which a cover plate 54 positioned therein beneath the plate 43 may freely slide. An actuating member 56, having substantially the shape of an inverted J as seen in Fig. 4, is provided with an insulated handle 57 and is rigidly connected at its shorter end to the cover plate 54 by bolts 58—58 (Figs. 3 and 4). A plate 60 having an elongated slot 61 formed therein is secured by means of screws 64—64 upon a shoulder 63 extending from the body portion 39, and bolts 66—66 extending through the slot 61 are rigidly secured to an offset arm 68 extending from the longer arm of the actuating member 56 for guiding the latter member when actuated from side to side, as seen in Figs. 2, 3 and 5. Rigidly secured to the arm 68 is an arc-shaped arm 70 having a rectangular shaped portion 71 (Fig. 5) formed upon the end thereof which is adjacent the longer arm of the actuating member 56.

A pipe 73 leading to a supply of a vulcanizing medium, such as steam under pressure, is connected through a three-way valve 74 to the bottom of the body portion 39 of the connecting member 38, while a pipe 75 leading to the open air is also connected to one of the ports of the valve 74. A lever 76 for manipulating the valve 74 is provided with a laterally extending finger 77 having a lug 78 extending therefrom, which latter members coact with the arms 68 and 70 and the rectangular portion 71 on the arm 70 to control the movement of the lever 76. An outlet pipe 80 leading to a steam trap or other similar device (not shown) is connected to the vulcanizing chamber 20 adjacent the outlet end thereof to provide means for the removal of the liquid resulting from the condensation of the steam within the vulcanizing chamber 20.

The operation of the apparatus is as follows: A reel 10 carrying a supply of wire 11 to be sheathed is placed in the position shown in Fig. 1 and one end of the wire 11 is passed through the wire straightening device 12, around the capstan 14, through the extrusion mechanism 18, through the connecting member 38, into and through the vulcanizing chamber 20, out of the chamber 20 through the seal 35, around the sheave 24, over the idler pulley 25, around the capstan 26, and onto the take-up reel 27.

During this operation the lever 76 is maintained in a horizontal position, as shown in Fig. 5, in which position the supply of stem is cut off from the connecting member 38 and the latter member is connected to the open air through the pipe 75, and the cover plate 54 is maintained in the position shown in Fig. 5 so as to provide access to the interior of the connecting member through the openings 44 and 49 which provide an outlet through which the wire may be threaded through the vulcanizing chamber 20.

After the wire has been threaded through the various parts of the apparatus in the manner outlined above, the cover plate 54 is moved by means of the actuating member 56 into the position shown in Fig. 2, in which position it covers the outlet provided by the openings 44 and 49 in the plates 43 and 48, respectively. The lever 76 is then rotated in a counter-clockwise direction, as seen in Figs. 2 and 5, from a horizontal position, as seen in Fig. 5, to a vertical position as shown in Fig. 2, in which latter position the members constituting the valve 74 are so positioned that steam under pressure is admitted into the connecting member 38 from the pipe 73 and the port of the valve 74 associated with the pipe 75 is closed. When steam under pressure is admitted into the connecting member 38 the pressure of the steam acting against the underside of the cover plate 54 forces the latter member tightly against the gasket 47 so that the cover plate 43 seals the outlet formed by the openings 44 and 49 against the escape of the stem by the pressure of the latter medium.

When the vulcanizing chamber 20 has had sufficient time to become heated by the steam admitted into the interior thereof, the mechanisms (not shown) furnishing power to the capstans 14 and 26 and the take-up reel 27 are started and the extruding mechanism 18 is also put into operation, whereupon a sheath of a vulcanizable substance, such as a rubber compound, is formed upon the wire passing through the extrusion mechanism, which sheathed wire is conveyed into and through the vulcanizing chamber 20 wherein it is subjected to sufficient heat and pressure to completely vulcanize the material forming the sheath upon the wire. The wire covered with a vulcanized insulating sheath emerges from the vulcanizing chamber 20 through the seal 25 which permits the withdrawal of the sheathed wire but prevents the escape of an appreciable quantity of the vulcanizing medium. The sheathed wire then passes over the pulley 24, around the capstan 26 and is wound upon a take-up reel 27 where it may be stored until used.

Referring to Fig. 5 of the drawing, it will be evident that with the parts in the positions shown in that figure it will be impossible to manipulate the lever 76 and to thereby admit the vulcanizing medium into the connecting member 38 because if an attempt is made to rotate the lever 76 the lug 78 extending from the finger 77 will strike against the arm 68 and prevent movement of the lever 76. When the actuating member 56 is moved towards the left, as seen in Fig. 5, the arm 68 formed upon the lower end thereof will still prevent movement of the lever 76 until the end of the arm 68 clears the lug 78, and even after the arm 68 has cleared the lug 78 it is impossible to actuate the lever 76 until the arcuate arm 70 secured to the arm 68 is advanced past the inner end of the finger 77. The above described members are so proportioned that it is impossible to actuate the lever 76 until the actuating member 56 has been advanced almost into its extreme left hand position, as seen in Fig. 2, and when so positioned the cover plate 54 which is actuated thereby completely covers the outlet leading into the body portion 39. When the above described members, except the lever 76, are in the position shown in Fig. 2, the lever 76 may be rotated in a counter-clockwise direction from the position shown in Fig. 5 into the position shown in Fig. 2 to admit steam in the connecting member as described hereinbefore. When the lever 76 is in the position shown in Fig. 2, the inner end of the finger 77 is in contact with the rectangular portion 71 of the arm 70 and the finger 77 and the lug 78 formed thereon coact with the arms 70 and 68, respectively, to lock the members in the position shown in Fig. 2. Should an attempt be made to move the cover plate 54 from the position shown in Fig. 2 when the lever 76 is in the position shown in that figure, the rectangular portion 71 on the arm 70 and the arm 68 will engage the inner end of the finger 77 and the lug 78, respectively, and will be prevented by the last mentioned members from being moved.

It will thus be seen that it is impossible to manipulate the lever 76 so as to admit steam under pressure into the connecting member while the outlet leading to the interior thereof is uncovered and it is also impossible to move the cover plate 54 to expose the outlet when the cover plate is positioned so as to close the outlet and the lever 76 is positioned so as to admit steam into the connecting member 38. Since the cover plate 54 is held in position over the outlet by the pressure of the steam within the connecting member, the cover plate cannot be actuated to uncover the outlet until the pressure of the steam has been substantially completely released, even if the connecting member is in communication with the open air. By the above described arrangement the device is rendered practically foolproof and persons operating the device may do so without any fear of being injured by the escape of the steam under pressure should they inadvertently attempt to manipulate either the actuating member 56 or the lever 76 when the parts are in an improper position for such manipulation.

The connecting member 38 not only provides a convenient means through which the wire to be sheathed may be threaded through the vulcanizing chamber when the wire is initially threaded therethrough, but also offers a convenient means for splicing the ends of the wire if the wire should happen to break during its passage through the apparatus. In case the wire breaks, or in case it is desired to splice a new wire to the one which is being advanced through the apparatus, the lever 76 is rotated in a clockwise direction, as seen in Fig. 2, to disconnect the supply of steam from the connecting member 38 and to connect the latter member to the open air through the pipe 75, whereupon the pressure within the connecting member and the vulcanizing chamber 20 is released. The cover plate 54 is then moved to the right into the position shown in Fig. 5 by means of the actuating member 56 whereupon the ends of the wire may be drawn into the connecting member 38 wherein they may be reached through the outlet formed by the openings 44 and 49 for the purpose of splicing. After the ends of the wire have been spliced the cover plate 54 may be advanced to close the outlet and the steps outlined above may be repeated to continue the operation of the apparatus.

What is claimed is:

1. In an apparatus for producing sheathed articles, means for sheathing a core with a vulcanizable substance, a vulcanizing chamber containing a vulcanizing medium under pressure, and means for effecting a pressure-tight connection between the sheathing means and the vulcanizing chamber, said connecting means having an outlet for providing access to the interior thereof and having a closure slidable longitudinally thereof for sealing the outlet against the escape of the vulcanizing medium by the pressure thereof.

2. In an appartus for producing sheathed articles, means for sheathing a core with a vulcanizable substance, a vulcanizing chamber, means for admitting a vulcanizing medium under pressure into the chamber, and a connecting member for effecting a pressure-tight connection between the sheathing means and the vulcanizing chamber, said connecting member having an outlet for providing access to the interior thereof and having associated therewith a cover slidable longitudinally thereof for closing the outlet held in operative relationship with the member by the pressure of the vulcanizing medium.

3. In an apparatus for producing sheathed articles, means for sheathing a core with a vulcanizable substance, a vulcanizing chamber, means for admitting a vulcanizing medium under pressure into the vulcanizing chamber, and a connecting member for effecting a pressure-tight connection between the sheathing means and the vulcanizing chamber, said connecting member comprising a chambered body portion having an outlet formed therein for providing access to the interior thereof, and a freely movable member slidable longitudinally thereof for closing the outlet held in operative position by the pressure of the vulcanizing medium.

4. In an apparatus for producing sheathed articles, means for applying a sheathing of a vulcanizable substance upon a core, a vulcanizing chamber, means for admitting a vulcanizing medium under pressure into the vulcanizing chamber, and a connecting member for effecting a pressure-tight connection between the sheathing means and the vulcanizing chamber, said connecting member comprising a chambered body portion provided with attaching means at each end and having an outlet communicating with the interior thereof, and a cover slidable longitudinally of the connecting member for sealing the outlet against the escape of the vulcanizing medium by the pressure thereof.

5. In an apparatus for producing sheathed articles, a vulcanizing chamber, means for providing access to the entrance of said chamber, said last mentioned means having an outlet and a cover therefor slidable longitudinally of the vulcanizing chamber, means for admitting a vulcanizing medium under pressure into the chamber, and means for controlling the last mentioned means in accordance with the position of the cover with respect to the outlet.

6. In an apparatus for producing sheathed articles including means for sheathing a core with a vulcanizable substance and a vulcanizing chamber, a connecting member for effecting a pressure-tight connection between the sheathing means and the vulcanizing chamber, said member having an outlet for providing access to the interior thereof and having a cover slidable longitudinally thereof associated therewith for closing the outlet, means for admitting a vulcanizing medium into the vulcanizing chamber, and means for controlling the last mentioned means in accordance with the position of the cover with respect to the outlet.

7. In an apparatus for producing sheathed articles, means for sheathing a core with a tubular vulcanizable substance, a vulcanizing chamber, means for admitting a vulcanizing medium under pressure into the chamber, a connecting member for effecting a pressure-tight connection between the sheathing means and the chamber, said connecting member having an outlet for providing access to the interior thereof and having a closure slidable longitudinally of the tubular vulcanizing chamber for sealing the outlet against the escape of the vulcanizing medium by the pressure thereof, and means associated with the closure for preventing the admission of the vulcanizing medium when the closure is in open position.

8. In an apparatus for continuously producing a vulcanized sheathed article, means for simultaneously advancing and sheathing the article with a vulcanizable substance, a tubular vulcanizing chamber containing a vulcanizing medium under pressure, and a connecting member between the sheathing means and the vulcanizing chamber comprising means slidable in the direction of movement of the article to permit unobstructed access to the vulcanizing chamber and means cooperating with said last mentioned means for effecting a pressure tight seal due to the pressure of the vulcanizing medium.

9. In an apparatus for continuously producing a vulcanized sheathed article, means for simultaneously advancing and sheathing the article with a vulcanizable substance, a tubular vulcanizing chamber, means for admitting a vulcanizing medium under pressure into the chamber, and a connecting member between the sheathing means and the chamber comprising means slidable in the direction of movement of the article to permit unobstructed access to the vulcanizing chamber, and means cooperating with said last mentioned means for effecting a pressure-tight seal due to the pressure of the vulcanizing medium.

In witness whereof, I hereunto subscribe my name this 23rd day of September, A. D. 1927.

RAY CHARLES KIVLEY.